United States Patent [19]

Shaffer

[11] Patent Number: 5,523,359
[45] Date of Patent: Jun. 4, 1996

[54] FUNCTIONALIZED POLYMER AND METHODS TO OBTAIN FUNCTIONALIZED POLYMER

[75] Inventor: Timothy D. Shaffer, Dickinson, Tex.

[73] Assignee: Exxon Chemical Patents Inc., Wilmington, Del.

[21] Appl. No.: 372,735

[22] Filed: Jan. 13, 1995

[51] Int. Cl.$^6$ .................................................. C08F 8/00
[52] U.S. Cl. .................................................. 525/288
[58] Field of Search .................................................. 525/288

[56] References Cited

U.S. PATENT DOCUMENTS

| | | |
|---|---|---|
| 3,715,313 | 2/1973 | Haseltine, Jr. et al. . |
| 4,276,394 | 6/1981 | Kennedy et al. . |
| 4,316,973 | 2/1982 | Kennedy . |
| 4,342,849 | 8/1992 | Kennedy . |
| 4,429,099 | 1/1984 | Kennedy . |
| 4,524,188 | 6/1985 | Kennedy et al. . |
| 4,888,389 | 12/1989 | Kennedy et al. . |
| 4,910,321 | 3/1990 | Kennedy et al. . |
| 4,939,184 | 7/1990 | Kennedy . |
| 4,942,204 | 7/1990 | Kennedy . |
| 5,032,653 | 7/1991 | Cheradame et al. . |
| 5,169,914 | 12/1992 | Kaszas et al. . |
| 5,350,819 | 9/1994 | Shaffer . |

FOREIGN PATENT DOCUMENTS

| | | |
|---|---|---|
| 0206758 | 12/1986 | European Pat. Off. . |
| 0264214 | 4/1988 | European Pat. Off. . |
| 0341012 | 11/1989 | European Pat. Off. . |
| 94/13718 | 6/1994 | WIPO . |

OTHER PUBLICATIONS

CA 1990:532915 or 113:132915, "Synthesis of Novel Poly-(butyl vinyl either)/poly(methyl methaurylate) Copolymers", Verma et al., 1990.
H. G. Elias, Macromolecules, Plenum Press, New York, 1984 vol. 1, p. 6.
J. Seyden–Penne, Reductions by the Alumino— and Borohydrides in Organic Synthesis, VCH Publishers, New York, 1991.
R. C. Larock, Comprehensive Organic Transformations, VCH Publishers, New York, 1989.
M. Sawamoto, et al. Macromolecules, 20, 1 (1987).
H. Fukui, et al in Macromolecules, 26, 7315 (1993) and Macromolecules 27, 1297, (1994).
Z. Fodor, et al, Polym. Prepr. Amer. Chem. Soc., 35(2), 492 (1994).
B. Ivan, et al, J. Polym. Sci., Part A, Polym. Chem., 28, 89 (1990).
K. Miyashita, et al, in J. Polym. Sci., Polym. Chem., 32, 2531 (1994).

*Primary Examiner*—Bernard Lipman
*Attorney, Agent, or Firm*—Catherine L. Bell; Jaimes Sher

[57] ABSTRACT

This invention relates to functionalized polymers and a method to obtain them comprising combing a living polymer or a polymer having a terminal halide group with an silyl enol ether.

14 Claims, 1 Drawing Sheet

FUNCTIONALIZED POLYMER AND METHODS TO OBTAIN FUNCTIONALIZED POLYMER

FIELD OF THE INVENTION

This invention relates to polymers containing functional groups and methods to obtain such polymers.

BACKGROUND OF THE INVENTION

End functionalized polymers, such as end functionalized polyisobutylenes, are useful as modifiers in oleaginous compositions, as well as being important starting materials for preparation of useful materials such as polyurethanes and amphiphilic networks. Typically functionalized polymers, such as functionalized polyisobutylenes, are prepared by multistep processes that require isolation of the polymer in at least two steps. However, multistep processes are commercially undesirable.

With the advent of carbocationic living polymerizations, there have been attempts to functionalize the living polymers. The extent of success of these attempts are directly linked to the type of monomer being polymerized. Simple one-pot (or in-situ) chain end functionalization of more reactive carbocationic monomers, like isobutyl vinyl ether, can occur using ionic nucleophilic additives, i.e. methanol, alkyl lithium, etc. (see M. Sawamoto, et al. Macromolecules, 20, 1 (1987).) An additional method for end-capping living polymers with these more reactive cationic monomers is disclosed for coupling of poly(isobutyl vinyl ether) chains with silyl ketene acetals or silyl enol ethers in H. Fukui, et al in Macromolecules, 26, 7315 (1993) and Macromolecules 27, 1297, (1994). However, chain end functionalization does not occur when these additives are added to the living polymerization of less reactive monomers such as isobutylene. (see Z. Fodor, et al, Polym. Prepr. Amer. Chem. Soc., 35(2), 492 (1994).) Addition of the nucleophilic reagents at the end of isobutylene polymerization resulted in the consumption of the catalyst and the formation of t-alkyl chloride chain ends on the polyisobutylene rather than the desired nucleophilic substitution. Consequently, a multi-step process would be required to functionalize a living polymer from these less reactive monomers. Even when one considers that allylic chain ends can be provided by an in-situ functionalization of living polyisobutylene by adding allyl-trimethylsilanes at the end of polymerization, (see EPA 0 264 214 or B. Ivan, et al, J. Polym. Sci., Part A, Polym. Chem., 28, 89 (1990) this functionalization limits the choice of chemistries to introduce functional groups, however. Thus, there is a need in the art to provide single and two or three step processes to provide functionalized living polymers comprising less reactive cationic monomers, such as isobutylene.

Electrophilic displacement reactions have thus far not been considered a viable option with living polymers made using strong Lewis acids since it is thought that the concentration of active chain ends is too small for further reaction. While such displacements have been carried out with non-polymeric halides, such as 1-adamantyl, there is no indication that such displacements will be successful with living polymers, such as polyisobutylene.

Recently, functionalization of living polystyrene has been carried out with silyl ketene acetals and silyl enol ethers as disclosed in K. Miyashita, et al, in J. Polym. Sci., Polym. Chem., 32, 2531 (1994). As this system uses a $SnCl_4/R_4N^+Cl^-$ catalyst system to achieve living polymerization, it requires a 200 fold excess of the silyl enol ether to complete the end cap in a quantitative manner. As the authors point out, although this method leads to selective and nearly quantitative end-functionalization, the large excess of silyl enol ether makes this method a less than practical method to derive end-functionalized polystyrenes. The instant invention demonstrates a method which significantly reduces the amount of silyl enol ether to practical levels and achieves end functionalization by appropriate choice of Lewis acid catalyst system.

BRIEF DESCRIPTION OF THE INVENTION

This invention relates to functionalized polymers, and a method to obtain them comprising combing a living polymer or a polymer having a terminal halide group with a silyl enol ether. For the purposes of this invention, "living" cationic polymerization is defined as polymerization conditions under which control of molecular weight is determined by $DP_n=[M]/[I]$ (where DP is the number average degree of polymerization, [M] is the monomer concentration, and [I] is the initiator concentration), leading to a linear relationship between Mn and polymer yield within the scope of experimental error. Chain transfer as well as termination are essentially absent during and following the polymerization through a time, preferably of 2 to 3 hours or more, more preferably at least 5 minutes, in which functionalization can be effected. By "essentially absent" is meant 15% or less of the chains are permanently affected by chain transfer of termination. Thus a living polymer is a polymer having an active chain end that has not undergone termination or chain transfer. To determine whether less than 15% of the polymer has undergone chain termination or transfer plot the theoretical Mn versus the yield, then compare the Mn value as measured by GPC, using calibration based on polyisobutylene standards. If the measured Mn value falls more than 15% above or below the line describing calculated Mn versus yield, then the system has more than 15% chain transfer or termination.

This invention further relates to novel compositions produced during and by the method above.

BRIEF DESCRIPTION OF THE INVENTION

FIG. 1 illustrates how initiation sites control the number of functional chain ends.

DETAILED DESCRIPTION OF THE INVENTION

Figure 1:
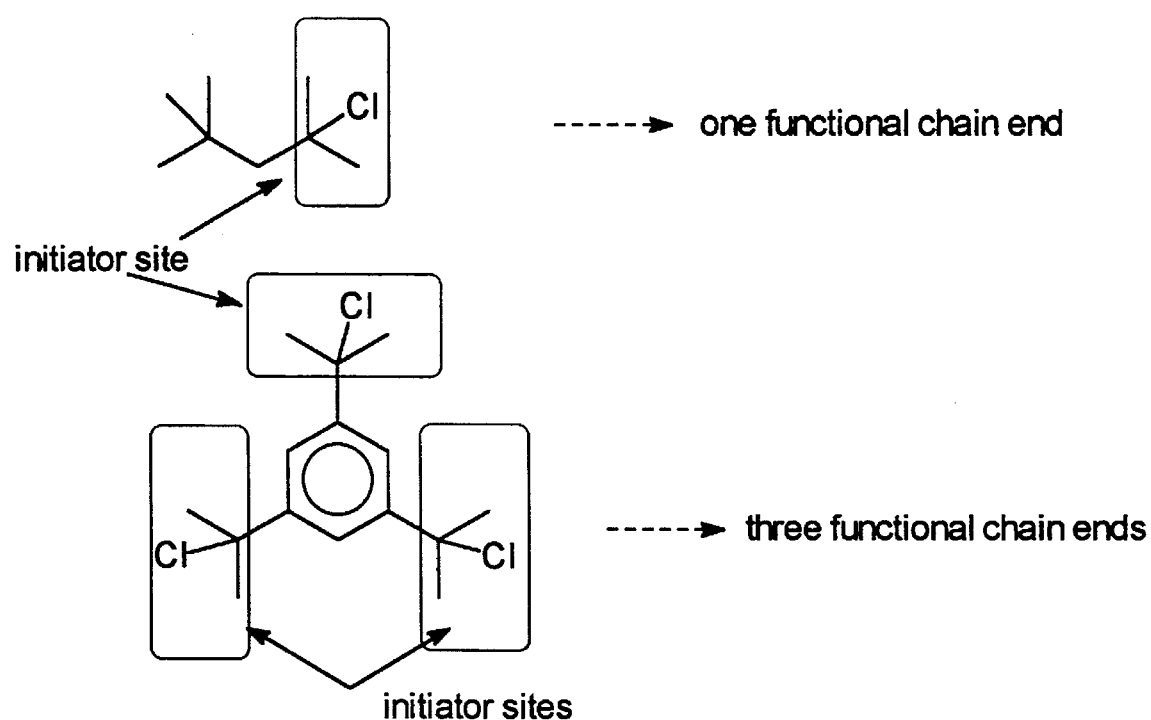

This invention relates to functionalized polymers, preferably functionalized living polymers, even more preferably functionalized living carbocationic polymers. This invention further relates to a method to obtain such functionalized polymers comprising contacting a living polymer or a halide terminated polymer with one or more silyl enol ethers under reaction conditions. In a preferred embodiment the silyl enol ether is added to a living isobutylene polymerization just after 100% conversion of monomer to polymer. Furthermore this invention may be used to prepare functionalized narrow molecular weight distribution (Mw/Mn) polymers in a single reactor or in sequential reactors.

In a preferred embodiment the polymer to be combined with the silyl enol ether is preferably a polymer comprising one or more monomers selected from olefinic, α-olefinic, di-substituted olefinic or styrenic monomers. Preferred monomers include any hydrocarbon monomer that is cationically polymerizable, i.e. capable of stabilizing a cation or propagating center because the monomer contains an electron donating group. A suitable list of these monomers includes, but not limited to, those monomers described in J. P. Kennedy, Cationic Polymerization of Olefins: A Critical Inventory, John Wiley and Sons, New York, 1975, which is incorporated by reference herein. Particularly preferred monomers include one more of olefins, α-olefins, disubstituted olefins, isoolefins, styrene and/or substituted styrenics containing 1 to 20 carbon atoms, more preferably 1 to 8, even more preferably 2 to 6 carbon atoms. Examples of preferred monomers include styrene, para-alkylstyrene, para-methylstyrene, alpha-methyl styrene, isobutylene, 2-methylbutene, 2-methylpentene, isoprene, butadiene and the like. A particularly preferred monomer combination comprises isobutylene and para-methyl styrene, while a particularly preferred homopolymer is polyisobutylene.

The polymer to be combined with the silyl enol ether may be any molecular weight, including Mn's from as low as 200, or 500 to one million or more. Depending on the end use desired, various Mn's are preferred. For example, for use in various oleaginous composition, such as additives and lubricants, Mn's of about 300 to 10,000 are preferred, with Mn's of about 450 to about 4,000 being especially preferred. In alternate embodiments Mn's of about 500 to about 2200 are preferred, Mn's of 500 to about 1300 are more preferred, while Mn's of between about 450 to about 950 are particularly preferred. In additional embodiments, functionalized polymers of higher molecular weights are preferred. For example, functionalized polymers with Mn's of up to 300,000 or more may be used in the tire and rubber industry as base polymers or modifying polymers for blending.

Methods to obtain living polymers that may be combined with the silyl enol ethers include those methods disclosed in EPA 206 756; U.S. Pat. Nos. 5,350,819; 5,169,914; 4,910,321; and U.S. Pat. No. 08/128,449 filed Sep. 28, 1993, all of which are incorporated by reference herein. Halide terminated polymers may be prepared by non-living polymerization techniques. Examples include U.S. Pat. Nos. 4,276,394; 4,524,188; 4,342,849; and 4,316,973, which are incorporated by reference herein. In a preferred embodiment dimethyl aluminum chloride combined with any tertiary alkyl initiator in a solvent system having a dielectric constant of about 2.4 to about 4 is selected to produce the living polymer.

Living polymerization may be achieved using a variety of methods, some of which are described in U.S. Pat. Nos. 5,350,819; 5,169,914; and 4,910,321. General conditions under which living polymerizations can be achieved for isobutylene include:

(1) a catalyst comprising an initiator of a tertiary alkyl halide, a tertiary aralkyl halide, a tertiary alkyl ether, a tertiary aralkyl ether, a tertiary alkyl ester, a tertiary aralkyl ester, or the like;

(2) a Lewis acid co-initiator which typically comprises a halide of titanium, boron or aluminum;

(3) a proton scavenger and/or electron donor;

(4) a solvent whose dielectric constant is selected considering the choice of the Lewis acid and the monomer in accord with known cationic polymerization systems; and (5) monomers.

A proton scavenger is defined in U.S. Pat. No. 5,350,819. Electron donors have been defined in EPA 341 012. Both of which are incorporated by reference herein.

One may obtain a halide terminated polymer useful in this invention using a system of initiator-transfer agents, called inifers. Using inifers for isobutylene polymerization, one can prepare polymer chains terminated in a halide group. These are referred to as telechelic polymers. A detailed discussion of the uses for these inifers and the types of telechelic polymers prepared is found in U.S. Pat. Nos. 4,316,673 and 4,342,849, which is incorporated by reference herein. Such polyisobutylenes terminated with tertiary halides, typically tertiary chlorines, may be combined with the silyl enol ethers of this invention to produce functionalized polymer under the methods described herein. These pre-made halogenated polymers may be thought of as a substitute for the initiator and monomer present in a living polymerization framework and are treated as equivalent, in terms of end group functionality, to the polymers prepared by the living polymerization of isobutylene. Typically these halogenated polymers are added to the catalyst system by dissolving the polymer in solvent of choice, much the same way that monomer and initiator are added to a living polymerization charge. The stoichiometry of the catalyst ingredients are calculated assuming that the pre-made polymer is a substitute for the initiator, i.e. one halide terminus is equal to one initiator site. All ingredients are added and equilibrated at the desired temperature before the Lewis acid is introduced. After an equilibration time of 0.5 to 20 minutes, the mixture is considered as the equivalent to the living polymer prepared under these catalyst conditions at complete monomer conversion. Functionalization proceeds according to the method described herein.

A telechelic polymer is defined to be an oligomer with known functional end groups in accordance with the definition given in H. G. Elias, Macromolecules, Plenum Press, New York, 1984 Vol. 1, pg 6, which is incorporated by reference herein.

In a preferred embodiment the silyl enol ether is represented by the formula:

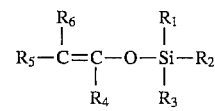

wherein $R_1$, $R_2$ and $R_3$ are, independently, hydrogen or a $C_1$ to $C_{30}$ linear, cyclic, or branched alkyl, aryl, phenyl or aromatic group, provided that at least one of $R_1$, $R_2$ and $R_3$ is an alkyl and further provided that $R_1$, $R_2$ or $R_3$ or any combination thereof may be joined to form a cyclic structure having the Si group as a member of the cyclic structure;

$R_4$ is an ether, alkyl, aryl, phenyl, aromatic, or allyl group, provided that when $R_4$ is an ether group it is represented by the formula —O—$R_7$, wherein $R_7$ is a alkyl, aryl, phenyl, aromatic, allyl group; and $R_5$ and $R_6$ are, independently, an alkyl, aryl, phenyl, aromatic, allyl or group, provided that two or more of $R_3$, $R_4$, $R_5$ and $R_6$ may be connected in a cyclic or fused ring structure. In a preferred embodiment the silyl enol ether is an alkyl silyl enol ether, i.e. it is substituted with at least one alkyl group and all substitutions are alkyl groups. For example in the formula above all of $R_1$–$R_6$ are alkyl groups or H, provided that at least on of $R_1$ to $R_6$ is an alkyl group. In another preferred embodiment the silyl enol ether is an aryl silyl enol ether, i.e. it is substituted with at least one aryl group and all substitutions are aryl groups. For example in the formula above all of $R_1$–$R_6$ are aryl groups or H, provided that at least on of $R_1$ to $R_6$ is an aryl group. In yet another preferred embodiment the silyl enol ether contains both aryl and alkyl groups, i.e. it is substituted with at least one aryl group and at least one alkyl group and all substitutions are aryl or alkyl groups. For example in the formula above all of $R_1$–$R_6$ are aryl groups, alkyl groups or H, provided that at least one of $R_1$ to $R_6$ is an aryl group and at least one of $R_1$ to $R_6$ is an alkyl group. In another preferred embodiment $R_1$, $R_2$ and $R_3$ are methyl groups.

Techniques under which the living polymer or a polymer terminated with a halogen and the silyl enol ether are combined are typical conditions known to those of ordinary skill in the art, such as, but not limited to, suspending the silyl enol ether in a solvent and thereafter combining with the neat, suspended or dissolved living polymer or the halide terminated polymer. The neat silyl enol ether may also be directly added to the neat, suspended or dissolved living polymer or the halide terminated polymer.

The number of functional groups on the silyl enol ether modified polymer is determined by the number of initiator sites in the initiator. For example, initiation of isobutylene from 2-chloro-2,4,4-trimethylpentane leads to a polymer with one functional group per chain. Whereas 1,3,5-(1-chloro-1-methylethyl)benzene will produce a polymer with three functional groups per chain. The molecular weight of the polymer chain can be manipulated by varying the ratio of the concentrations of the monomer to the initiator as in most living polymerizations. See for example U.S. Pat. Nos. 5,350,819; 5,169,914; 4,910,321 and U.S. Ser. No. 128,449 filed Sep. 28, 1993, which are incorporated by reference herein.

In a preferred embodiment as little as about one equivalent of silyl enol ether per chain end is sufficient to carry out the functionalization. Greater amounts of silyl enol ether are of course useful up to and including about 150 equivalents, however the preferred ranges of silyl enol ether to chain end are 0.5 to 20 equivalents per chain end, preferably 1 to 5 equivalents per chain end, even more preferably 1 to 2 equivalents per chain end. (Chain ends are determined by ascertaining the number of initiation sites per initiator molecule and multiplying that number by the number of initiator molecules present.)

The following picture helps visualize the determination of the number of initiator sites, which in turn leads to the number of functional chain ends per polymer as determined by the initiator used.

Typically the reaction is rapid and viable at temperatures of about −20° C. or below and the reaction is rapid and quantitative at temperatures of about −80° C. or below, especially −80° C. to about −100° C.

The silyl enol ether may be added neat or more preferably as a solution of the silyl enol ether in the chosen solvent for the polymerization. The addition may be singular and immediate or may be a more slowly controlled, metered addition. Additionally, the silyl enol ether may be added with additional Lewis acid catalyst, proton trap, electron donor, or any combination thereof which are typical components of the aforementioned living polymerization systems. In a preferred embodiment the Lewis acid does not react with the silyl enol ether.

Once the living polymer has been reacted with the silyl enol ether, it may be used in that form or modified to form another functional group by known chemistries. For example the functional group may be reduced, oxidized, hydrogenated and/or hydrolyzed. These additional reactions may be performed in the same reactor since isolation of the silyl enol ether containing polymer is optional. To illustrate this point the conversion of an aldehyde group is illustrated. This illustration does not intend to limit the scope of the instant invention. A polymer containing an aldehyde end group may be reduced with lithium aluminum hydride to an alcohol group. A variety of other reducing agents many of which are described in J. Seyden-Penne, Reductions by the Alumino- and Borohydrides in Organic Synthesis, VCH Publishers, New York, 1991, which is incorporated by reference herein, may also be used to reduce the aldehyde to a primary alcohol end group. Other means of converting an aldehyde to an alcohol or to other functional groups are commonly known in the art. (See, for example, R. C. Larock, Comprehensive Organic Transformations, VCH Publishers, New York, 1989 which is incorporated by reference herein). Similar constructions for functional group conversions could be constructed for other pseudohalide chain ended polymers. For a list of additional many of the possible modifications see page 56, et seq, of U.S. Ser. No 992,516, filed Dec. 17, 1992 and PCT WO 9413718, both of which are incorporated by reference herein.

A class of preferred products of this invention have a narrow molecular weight distribution (Mw/Mn), preferably of about 4 or less, more preferably of about 2.5 or less, even more preferably 1.75 or less. Likewise the methods described above produce polymers having a greater degree of functionalization than previously available by commercially viable processes. In a preferred embodiment the degree of chain end functionalization is about 70% or more, preferably 80%, or more, even more preferably 90% or more, as measured by proton NMR.

Another preferred class of products produced according to this invention may be used as starting materials for other desired products such as polyurethanes, amphiphilic networks or epoxy resins. For more information on using such starting materials for polyurethane or epoxy synthesis please see U.S. Pat. Nos. 4,939,184 and 4,888,389, and examples in U.S. Pat. Nos. 4,942,204 and 4,429,099 which are incorporated by reference herein in their entirety.

In a particularly preferred embodiment the functionalized polymer is a functionalized polyisobutylene polymer. In particular polyisobutylene of Mn's of between about 200 and 3000, preferably between about 450 and about 2200, more preferably between about 450 and about 1300, even more preferably between about 500 and about 950 are particularly preferred especially when functionalized with an aldehyde or ketone to form an alcohol functional group. These preferred polymers and other similarly functionalized polymers can be used in a variety of oleaginous compositions as modifiers. Preferred uses include lube oil, additive and dispersant uses. For an exhaustive list of the many possible uses and possible functional groups see U.S. Ser. No. 992,516, filed Dec. 17, 1992 and PCT WO 9413718, both of which are incorporated by reference herein.

By combining different initiators, monomers and silyl enol ethers, a variety of new polymer structures can be obtained. Furthermore, additional new polymer structures can be obtained by performing conversion chemistries, i.e. oxidation, reduction, hydrogenation, hydrolysis, etc. on the functionalized polymers prepared herein. Preferred examples of these structures are represented by the formula: R-[(polyolefin)-Y]n. Examples of the possible R, polyolefin and Y groups are listed in Table A. A desired polymer structure can be obtained by combining various groups from the initiator fragment column (R) with the desired polymer from the polymer column (polyolefin) and the end group (Y) from the in-situ end cap column or the converted end group column. Some initiator fragments are capable of generating more than one functional end group in the polymer, i.e. a trifunctional initiator will lead to a trifunctional star polymer. The n indicates the number of functional groups per polymer as dictated by the choice of R. It should be readily apparent to those of ordinary skill in the art that a ketone or an aldehyde is a precursor for an alcohol, an amine or similar functional groups readily obtained by simple conversion chemistries. The description of Y(converted end groups) in Table A describes a few of the many possible conversions available.

TABLE A

R-[(polyolefin)-Y]$_n$

| R when n = 1 | polyolefin |
|---|---|
| [cyclohexyl] | polyisobutylene |
| PhC(CH$_3$)$_2$— | polystyrene |
| PhC(CH$_3$)(C$_2$H$_5$)— | polyisobutylene-b-polystyrene |
| CH$_3$PhC(CH$_3$)$_2$— | polyisobutylene-r-polystyrene |
| t-BuPhC(CH$_3$)$_2$— | poly(p-methylstyrene) |
| ClPhC(CH$_3$)$_2$— | polyisobutylene-b-poly(p-methylstyrene) |
| t-Bu- | polyisobutylene-r-poly(p-methylstyrene) |
| t-octyl- | polyisobutylene-r-polyisoprene |
| AcOCH$_2$C(CH$_3$)$_2$— | poly(p-chlorostyrene) |
| (CH$_3$)$_3$Si— | polyisobutylene-b-poly(p-chlorostyrene) |
| (CH$_3$)$_2$Si(C$_2$H$_5$)— | polyisobutylene-r-poly(p-chlorostyrene) |
| (CH$_3$)Si(C$_2$H$_5$)$_2$— | polyindene |
| Ph$_3$Si— | polyisobutylene-b-poly(polyindene) |
| R when n equals 2 | |
| —C$_3$H$_6$— | polyisobutylene-r-poly(polyindene) |
| —C$_4$H$_8$— | polypropylene |
| —C$_5$H$_{10}$— | polyisobutylene-b-polypropylene |
| —C$_6$H$_{12}$— | polyisobutylene-r-polypropylene |
| —C(CH$_3$)$_2$CH$_2$C(CH$_3$)$_2$— | |
| —C(CH$_3$)$_2$PhC(CH$_3$)$_2$— | |
| —C(CH$_3$)$_2$Ph(t-Bu)C(CH$_3$)$_2$— | |
| —C(CH$_3$)$_2$C$_6$H$_{10}$C(CH$_3$)$_2$— | |
| R when n equals 3 | |
| [—C(CH$_3$)$_2$]$_3$Ph | |
| [—C(CH$_3$)$_2$]$_3$C$_6$H$_9$ | |

| Y (in-situ end group) | Y (converted end group) |
|---|---|
| —C(CH$_3$)$_2$CHO | —C(CH$_3$)$_2$CH$_2$OH |
| | —C(CH$_3$)$_2$COOH |
| | —C(CH$_3$)$_2$C=NPh |
| —C(CH$_3$)(Ph)CHO | —C(CH$_3$)(Ph)CH$_2$OH |
| | —C(CH$_3$)(Ph)COOH |
| | —C(CH$_3$)(Ph)C=NPh |
| —C(Ph)$_2$CHO | —C(Ph)$_2$CH$_2$OH |
| | —C(Ph)$_2$COOH |
| —C(CH$_3$)(C$_2$H$_5$)CHO | |
| —C(C$_2$H$_5$)$_2$CHO | |
| —CH((CH$_2$)$_2$Si(CH$_3$)$_2$Cl)CHO | |
| —CH$_2$CO(CH$_3$) | —CH$_2$CH(OH)CH$_3$ |
| | —CH$_2$C(=NPh)CH$_3$ |
| —CH(CH$_3$)CO(CH$_3$) | —CH(CH$_3$)CH(OH)CH$_3$ |
| | —CH(CH$_3$)C(=NPh)CH$_3$ |
| —CH$_2$CO(CH$_2$)$_3$Si(CH$_3$)$_2$Cl | |
| —CH$_2$CO(CH$_2$)$_2$Si(CH$_3$)$_2$Cl | |
| —CH$_2$COOCH$_3$ | |
| —CH$_2$COOPh | |
| —C(CH$_3$)$_2$COOCH$_3$ | —C(CH$_3$)$_2$COOH |

TABLE A-continued

R-[(polyolefin)-Y]$_n$

—CH(CH$_3$)COOCH$_3$

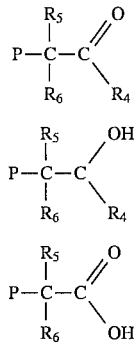

—CH(CH$_2$CH$_2$CH$_2$OH)COOH

Ph = phenyl, Ac = acetyl, Bu = butyl, t-Bu = tertiary butyl, t-octyl = tertiary octyl, Preferred products produced by the methods described above include those compounds represented by the formulae:

$$P-\underset{\underset{R_6}{|}}{\overset{\overset{R_5}{|}}{C}}-C\overset{\nearrow O}{\underset{\searrow R_4}{}}$$

$$P-\underset{\underset{R_6}{|}}{\overset{\overset{R_5}{|}}{C}}-C\overset{\nearrow OH}{\underset{\searrow R_4}{}}$$

$$P-\underset{\underset{R_6}{|}}{\overset{\overset{R_5}{|}}{C}}-C\overset{\nearrow O}{\underset{\searrow OH}{}}$$

wherein P is the polymer chain and R$_4$ is an ether, alkyl, aryl, phenyl, aromatic, or allyl group, provided that when R$_4$ is an ether group it is represented by the formula —O—R$_7$, wherein R$_7$ is a alkyl, aryl, phenyl, aromatic, allyl group; (of course, one of ordinary skill in the art will realize that when R$_4$ is an ether group that an ester group is formed in the formula above) and R$_5$ and R$_6$ are, independently, an alkyl, aryl, phenyl, aromatic, allyl or group, provided that two or more of R$_4$, R$_5$ and R$_6$ may be connected in a cyclic or fused ring structure.

Particularly preferred products include those represented by the formulae:

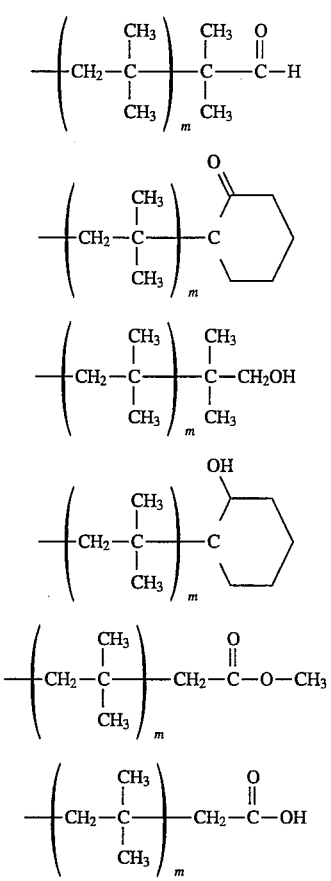

Wherein m is the number of isobutylene units in the polymer chain, typically between two and one million.

EXAMPLES

Molecular weight (Mw and Mn) were measured by Gel Permeation Chromotography using a Waters 150 gel permeation chromatograph equipped with a differential refractive index (DRI) detector and polystyrene standards. The numerical analyses were performed using a commercially available standard Gel Permeation Software package.

Percent functionalization is measured by proton NMR on a 250 MHz Bruker AC-250 Spectrometer from $CDCl_3$ solutions.

EXAMPLE 1

In a glass reactor, cooled to −30° C. or below, living polymer (about 1400 Mn) was made under the following conditions:

[Isobutylene monomer]=3.17 mol/l;
[Initiator]=0.137 mol/l of either 2-chloro-2,4,4-trimethylpentane (TMPCl) or 3-t-butyl-1,5-bis(1-chloro-1-methylethyl)benzene (BClME);
[Proton scavenger]=0.011 mol/l of di-tert-butylpyridine;
[Co-initiator]=0.067 mol/l of $TiCl_4$;
Solvent=60/40 volume/volume//hexane/methylene chloride;
Time=five minutes at −80° C., ten minutes at −30° C. and 5 minutes at −50° C.

Once monomer conversion reached 100% the silyl enol ether (SEE) was added, at 1.5 equivalents per initiation site, (i.e. 0.21 mol/l for reactions initiated with 2-chloro-2,4,4-trimethylpentane (TMPCl) and 0.41 mol/l for reactions initiated with 3-t-butyl-1,5-bis(1-chloro-1-methylethyl)benzene (BClME)), either neat or in at least 50 volume percent solution of the pseudohalide in the polymerization solvents was added in one addition to the polymerization mixture. The resulting mixture was allowed to react at the polymerization temperature or permitted to warm toward ambient temperature for at least one hour. The reaction was then quenched with methanol addition ([MeOH]=four times the $[TiCl_4]$). Thereafter the polymer was separated with a deionized water wash until neutral and the solvents were removed by vacuum. The data are listed in table 1.

TABLE 1

| Run | SEE | % Funct. | Initiator | Temp (°C.) |
|---|---|---|---|---|
| 1 | A | >90% | TMPCl | −80 |
| 2 | A | >90 | TMPCl | −80 |
| 3 | A | >80 | TMPCl | −50 |
| 4 | A | >80 | BClME | −80 |
| 5 | B | 100 | TMPCl | −50 |
| 6 | C | 63 | TMPCl | −50 |

% Funct = percent functionalization
SEE = silyl enol ether
A = 2-methyl-1-(trimethylsiloxy)-1-propene,
B = -1-trimethylsilyoxycyclohexene,
C = dimethylsilyl ketene acetal
BClME = 3-t-butyl-1,5-bis(1-chloro-1-methylethyl)benzene
TMPCl = 2-chloro-2,4,4-trimethylpentane All references, testing procedures and priority documents are incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby.

I claim:
1. A method for the functionalization of a polymer product comprising reacting a living polymer consisting essentially of hydrocarbon monomer(s) or a polymer consisting essentially of hydrocarbon monomer(s) having a terminal halide group with a silyl enol ether.

2. The method of claim 1 wherein the silyl enol ether is represented by the formula:

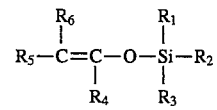

wherein $R_1$, $R_2$ and $R_3$ are, independently, hydrogen or a $C_1$ to $C_{30}$ linear, cyclic, or branched alkyl, aryl, phenyl, aromatic, or allyl group provided that at least one of $R_1$, $R_2$ and $R_3$ is an alkyl, and $R_4$ is an ether, alkyl, aryl, phenyl, aromatic, or allyl group, provided that when $R_4$ is an ether group it is represented by the formula —O—$R_7$, wherein $R_7$ is a alkyl, aryl, phenyl, aromatic, allyl group; and $R_5$ and $R_6$ are, independently, an alkyl, aryl, phenyl, aromatic, allyl or group, provided that two or more of $R_3$, $R_4$, $R_5$ and $R_6$ may be connected in a cyclic or fused ring structure.

3. The method of claim 2 wherein $R_1$, $R_2$ and $R_3$ are a $C_1$ to $C_{10}$ alkyl group.

4. The method of claim 2 wherein $R_1$, $R_2$ and $R_3$ are the same $C_1$ to $C_{10}$ group.

5. The method of claim 2 wherein $R_4$, $R_5$ and $R_6$ are joined into a fused ring structure.

6. The method of claim 1 where in the silyl enol ether is 2-methyl-1-(trimethylsiloxy)-1-propene, 1-trimethylksilyoxy-cyclohexane, or dimethylsilyl ketene acetal.

7. The method of claim 1 wherein the living polymer is isobutylene.

8. The method of claim 1 further comprising contacting the polymer product with a reduction, oxidation, hydrolization or hydrogentation agent.

9. The method of claim 1 further comprising contacting the polymer product with a reduction agent.

10. The method of claim 1 further comprising contacting the polymer product with a hydrogentation agent.

11. The method of claim 1 wherein polymer is a halide terminated polymer and the silyl enol ether is an alkyl silyl enol ether.

12. The method of claim 1 wherein polymer is a halide terminated polymer and the silyl enol ether is an aryl silyl enol ether.

13. The method of claim 1 wherein polymer is a halide terminated polymer and the silyl enol ether contains both alkyl and aryl groups.

14. The method of claim 1 wherein halide terminated polymer is terminated with chlorine.

* * * * *